Figure 1:
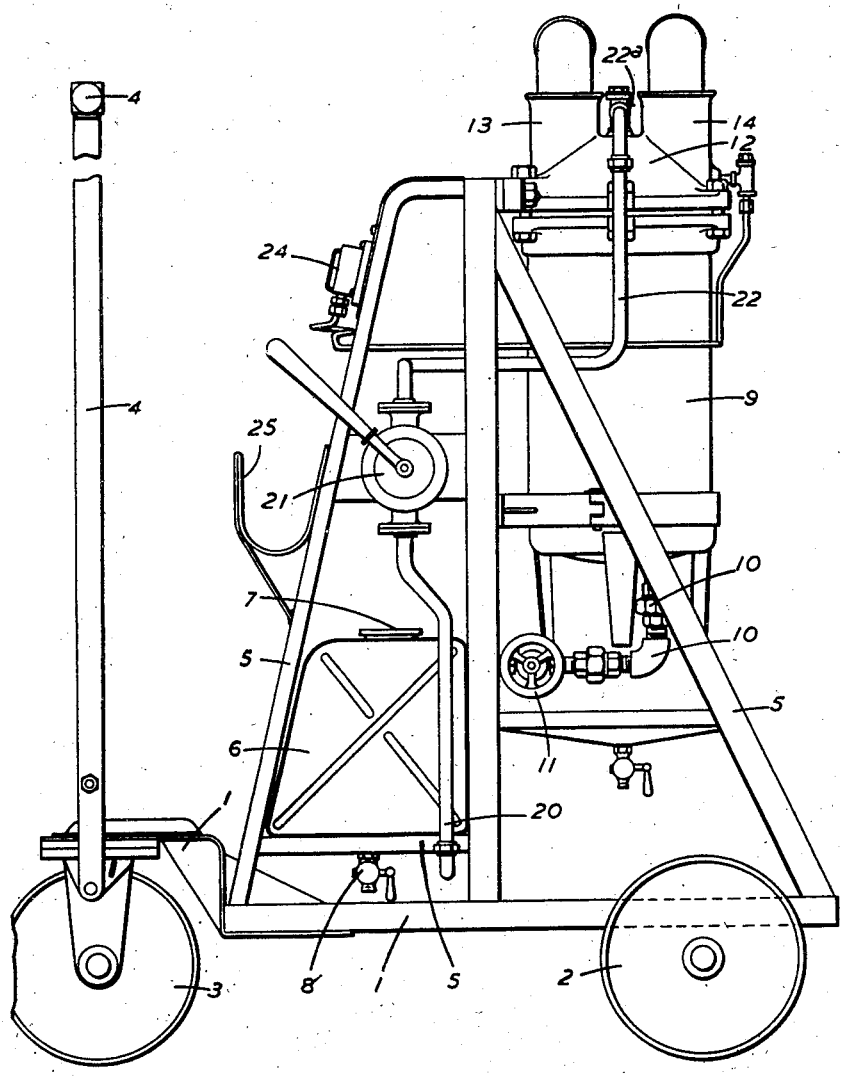

March 7, 1950  C. G. VOKES  2,499,705
FILTERING APPARATUS AND METHOD
Filed July 24, 1944  3 Sheets-Sheet 1

Cecil G. Vokes  Inventor
By
Attorney

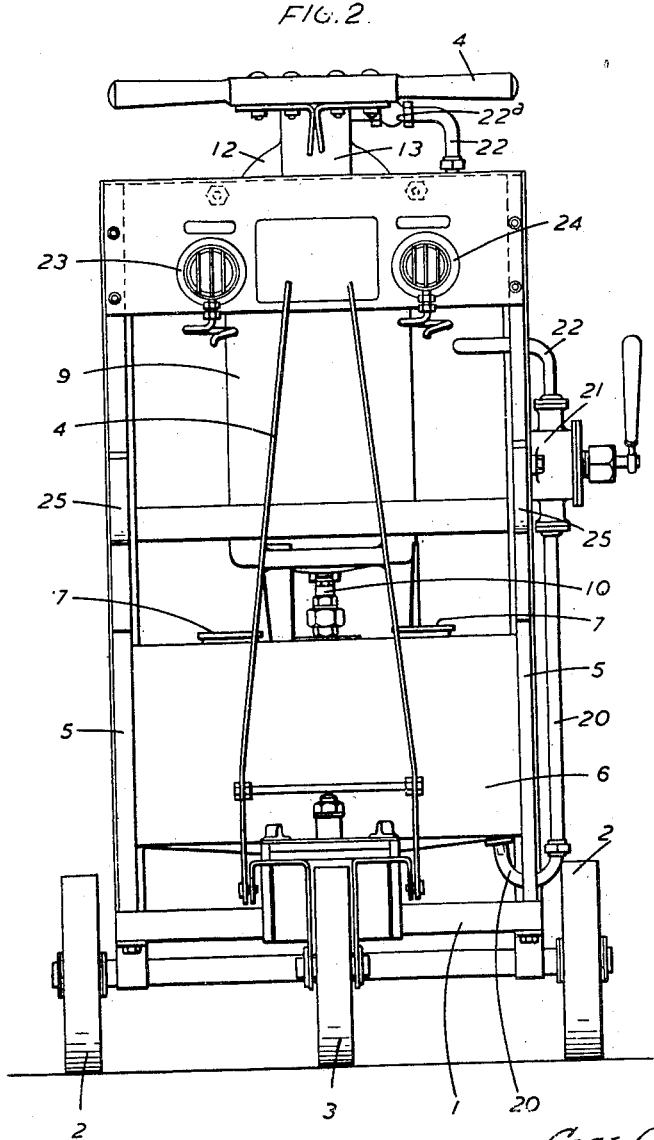

March 7, 1950    C. G. VOKES    2,499,705
FILTERING APPARATUS AND METHOD
Filed July 24, 1944    3 Sheets-Sheet 3
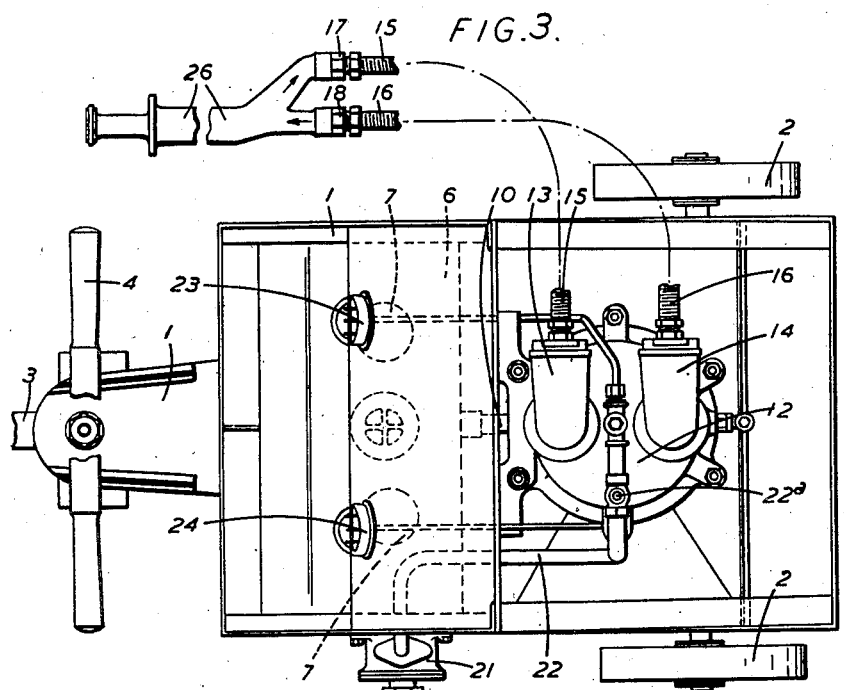
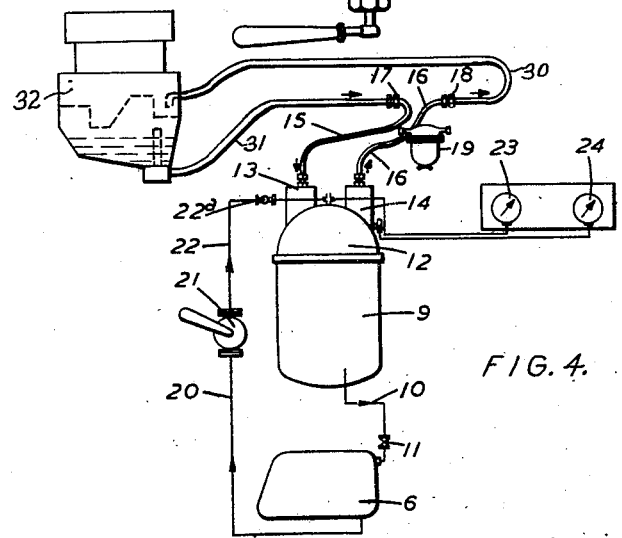
Inventor
Cecil G. Vokes
By
Attorney Patented Mar. 7, 1950

2,499,705

UNITED STATES PATENT OFFICE 2,499,705

FILTERING APPARATUS AND METHOD

Cecil Gordon Vokes, Guildford, England, assignor to Vokes Limited, Guildford, Surrey, England Application July 24, 1944, Serial No. 546,272
In Great Britain August 16, 1943

4 Claims. (Cl. 184—1.5)

For reasons of space and weight it is not unusual for filters to be used which are considerably below the ideal capacity and efficiency. The lubricating oil filters of aircraft engines, in particular, may require frequent servicing and cannot prevent fairly serious oil contamination after a number of running hours. The bearings and other parts to be lubricated will then almost certainly contain slivers or particles which ordinary methods of servicing will leave in the lubrication system. One of the ideas underlying the present invention is to service an engine of an aircraft or other vehicle or self-contained plant by connecting pipe lines from a filter independent of the vehicle or plant and of relatively very large capacity and high efficiency, so that it will temporarily replace the normal filter (if fitted) in the normal lubricating circuit, adding clean oil to the extent necessary for the increased capacity thus introduced, and running the engine, so that clean and efficiently filtered oil is forced through the whole lubrication system (including e. g. crank case and oil cooler) with the bearing parts in motion. When the whole of the oil in the circuit has thus been efficiently filtered, surplus is run off, the pipe lines disconnected and the normal filter (which has meanwhile been cleaned or renewed) replaced, leaving the engine with its lubrication system and bearing parts thoroughly cleaned and a full charge of clean oil ready for the next period of use. While primarily intended for lubricating circuits, it will be apparent that the idea can also be applied in suitable cases to fuel feed and other systems operated by an engine and normally containing a filter of limited capacity. For convenience of description it will be assumed hereinafter that it is applied to lubricating oil.

Apparatus according to the invention will conveniently include a filter and an oil storage chamber with means to supply oil to the clean side of the filter from the storage chamber and to return it to the chamber as desired, and flexible pipes with a suitable adaptor or connecting members whereby the clean and dirty sides of the filter can be connected in an engine lubricating system, so that the filter will temporarily replace the normal filter fitted to the engine. In order to avoid the use of excessive lengths of pipe, the apparatus should usually be of easily transportable form.

A typical form embodying the above and other parts of the invention is illustrated by the accompanying drawings. The parts of the invention for which a monopoly is desired are those delimited by the claims.

In the drawings,

Fig. 1 is a side elevation.
Fig. 2 is an end elevation.
Fig. 3 a plan and
Fig. 4 is a diagram, showing how the form illustrated is combined with an engine or other machine to furnish it with clean oil and clean its lubrication system while the normal filter is removed for servicing or replacement.

The trolley may be of any convenient form: as shown it has a body frame 1 with two fixed wheels, 2, 2 and a wheel 3 steerable by the handle 4. The body frame 1 has suitable framing 5 to support the various parts of the apparatus. Thus, near the bottom is the storage tank or reservoir 6 provided with filler cap 7 and drain cock 8. The filter 9 is mounted at a higher level. From the bottom of the filter casing a return pipe 10 with a control valve 11 allows oil to be returned by gravity from the filter to the tank 6. A header 12 at the top of the casing provides an inlet 13 which leads to the dirty side of the filter (possibly the interior of a finned cylindrical or star-shaped unit of known form) and an outlet 14 from the clean side, with connections for two lengths of flexible piping 15, 16 which carry the adaptor or other connections 17, 18 for replacing the normal engine filter 19 (Fig. 4). The connections 17, 18 are connected to the oil circulatory lines 30, 31 leading through the engine 32. A pipe 20 from near the bottom of the storage tank, a small hand or power-operated positive type of pump 21, and a delivery pipe 22 with check valve 22a from the pump to the clean side of the filter header enable a desired quantity of oil to be pumped from the storage tank into the filter. Pressure gauges, 23, 24 may be fitted to show the oil pressure developed at the inlet and outlet sides of the filter when the engine is running the difference indicating the pressure drop across the filtering screen. A rack 25 on the trolley will carry the flexible piping 15, 16 which may be connected together by a fitting 23 to form a closed circuit when desired. De-aeration or other further treatment of the oil can readily be included, as will be apparent. A by-pass circuit, giving very fine filtration of a proportion of the oil and returning it direct to the engine oil chamber or sump, can also be included in the filter, as is known in several suitable types.

The improved unit being portable is moved to the apparatus to be serviced, the connections 15 and 16 of the unit are connected to the oil circulating system of the apparatus to replace the normal filter thereof, and the engine of the apparatus started. The oil contained in the system of the apparatus is thus forced to circulate through the filter of the unit, which unit filter is of materially greater capacity and higher efficiency than the normal filter of the apparatus, until the oil of the apparatus system is thoroughly cleaned. The unit preferably includes a supply of thoroughly cleaned oil which may be selectively added to the oil on the clean side of the unit filter to bring the apparatus supply to the required volume, and following complete cleaning of the oil circulating system of the apparatus, the connection between the unit and apparatus is disconnected, the original filter of the apparatus is placed in service, and the unit, preferably after discharge of the refuse collected by the unit filter, may be readily moved to another apparatus for service.

I claim:

1. A method of oil servicing an apparatus having an engine and oil circulating system including an apparatus filter for the system, which method comprises connecting an extraneous and separable system to the oil circulating system of the apparatus where it will supersede the function of the apparatus filter with such extraneous system including inherent materially increased capacity and efficiency for oil cleaning over the apparatus filter, utilizing the power of the apparatus engine to circulate the oil of the apparatus system through the apparatus and through the extraneous system to clean the oil of the apparatus system, adding at will to the extraneous system a supply of clean oil to complete the volume of oil required by the apparatus, completely separating the extraneous system from the apparatus system, and restoring the function of the apparatus filter.

2. In combination, apparatus of the type including an engine, an oil circulating system and a normal filter in such system, a normally independent unit removably connectable to the apparatus and including a portable frame, a unit filter carried by such frame and having a capacity and efficiency materially exceeding that of the normal filter of the apparatus, means removably connecting the unit filter in a circulatory path including the circulatory path of the oil system of the apparatus to be subject to the engine of the apparatus for serving as the circulating force for the oil through the oil system of the apparatus and through the unit filter, and means carried by the frame to introduce into the circulatory system an additional supply of clean oil to supplement any depleted volume of the oil in the apparatus circulatory system.

3. A construction as defined in claim 2, wherein the additional oil supply means of the unit includes a tank for such oil, and a communication between the tank and the clean side of the unit filter.

4. A construction as defined in claim 2, wherein the additional oil supply means of the unit includes a tank for such oil, and a communication between the tank and the clean side of the unit filter, and wherein a manually-controlled pump is carried by the unit to transfer oil from such tank to the unit filter.

CECIL GORDON VOKES.

REFERENCES CITED

The following references are of record in the file of this patent:

UNITED STATES PATENTS

| Number | Name | Date |
| --- | --- | --- |
| 1,305,735 | Morris | June 3, 1919 |
| 1,884,819 | Osborne | Oct. 25, 1932 |
| 1,962,463 | Renfrew | June 12, 1934 |
| 2,134,435 | Cantrell | Oct. 25, 1938 |

FOREIGN PATENTS

| Number | Country | Date |
| --- | --- | --- |
| 688,072 | France | May 6, 1930 |